US012762824B2

(12) United States Patent
Basu et al.

(10) Patent No.: US 12,762,824 B2
(45) Date of Patent: Oct. 13, 2026

(54) METHOD AND SYSTEM FOR ADAPTIVE CORNER DETECTION USING DYNAMIC VISION SENSORS

(71) Applicant: City University of Hong Kong, Hong Kong (HK)

(72) Inventors: Arindam Basu, Hong Kong (HK); Pao-Sheng Vincent Sun, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 261 days.

(21) Appl. No.: 18/429,325

(22) Filed: Jan. 31, 2024

(65) Prior Publication Data

US 2025/0245958 A1 Jul. 31, 2025

(51) Int. Cl.
*G06V 10/44* (2022.01)
*G06V 10/88* (2022.01)

(52) U.S. Cl.
CPC .............. *G06V 10/44* (2022.01); *G06V 10/92* (2022.01)

(58) Field of Classification Search
CPC .......... G06V 10/44; G06V 10/92; G06T 7/13; G06T 7/70
See application file for complete search history.

(56) References Cited

U.S. PATENT DOCUMENTS

2020/0005469 A1* 1/2020 Daniilidis ............... G06T 7/246

OTHER PUBLICATIONS

A. Glover, A. Dinale, L. D. S. Rosa, S. Bamford and C. Bartolozzi, "IuvHarris: A Practical Corner Detector for Event-Cameras," in IEEE Transactions on Pattern Analysis and Machine Intelligence, vol. 44, No. 12, pp. 10087-10098, Dec. 1, 2022, doi: 10.1109/TPAMI.2021.3135635. (Year: 2021).*

Arren Glover et al., "luvharris: A practical corner detector for event-cameras," IEEE Transactions on Pattern Analysis and Machine Intelligence, 2021, vol. 44(12), p. 10087-10098.

Mark Horowitz, "Computing's Energy Problem (and what we can do about it)," IEEE International Solid-State Circuits Conference Digest of Technical Papers (ISSCC), 2014, p. 10-14.

Guillermo Gallego et al., "Event-based vision: A survey," IEEE Transactions on Pattern Analysis and Machine Intelligence, 2020, vol. 44(1), p. 154-180.

Patrick Lichtsteiner et al., "A 128×128 120 dB 15 μS Latency Asynchronous Temporal Contrast Vision Sensor," IEEE Journal of Solid-State Circuits, 2008, vol. 43(2), p. 566-576.

Christian Brandli et al., "A 240× 180 130 db 3 μS latency global shutter spatiotemporal vision sensor," IEEE Journal of Solid-State Circuits, 2014, vol. 49(10), p. 2333-2341.

(Continued)

*Primary Examiner* — Delomia L Gilliard

(74) *Attorney, Agent, or Firm* — IDEA Intellectual Limited; Sam T. Yip

(57) ABSTRACT

A method for adaptive corner detection is provided. The method includes: obtaining one or more event data from a dynamic vision sensor; capturing and organizing a plurality of recorded events of the event data into a 2D array; transforming the 2D array into one or a plurality of Ordered Surface (OS) matrices by populating one or a plurality of empty Image Matrices with the recorded events based on their coordinates and assigning order values; and applying a corner detector to the OS matrices. A system for adaptive corner detection is also provided.

13 Claims, 8 Drawing Sheets

(56) References Cited

OTHER PUBLICATIONS

Shoushun Chen et al., "Live demonstration: CeleX-V: A 1M pixel multi-mode event-based sensor," IEEE/CVF Conference on Computer Vision and Pattern Recognition Workshops (CVPRW), 2019, p. 1682-1683.
Valentina Vasco et al., "Fast event-based Harris corner detection exploiting the advantages of event-driven cameras," IEEE/RSJ International Conference on Intelligent Robots and Systems (IROS), 2016, p. 4144-4149.
Elias Mueggler et al., "The event-camera dataset and simulator: Event-based data for pose estimation, visual odometry, and SLAM," The International Journal of Robotics Research, 2017, vol. 36(2), p. 142-149.
Ignacio Alzugaray et al., "Asynchronous corner detection and tracking for event cameras in real time," IEEE Robotics and Automation Letters, 2018, vol. 3(4), p. 3177-3184.
Chris Harris et al., "A combined corner and edge detector," Alvey vision conference, 1988, vol. 15(50), p. 147-152.
Xavier Lagorce et al., "Hots: a hierarchy of event-based time-surfaces for pattern recognition," IEEE transactions on pattern analysis and machine intelligence, 2017, vol. 39(7), p. 1346-1359.
Pradeep Kumar Gopalakrishnan et al., "An Efficient Hash-based Data Structure for Dynamic Vision Sensors and its Application to Low-energy Low-memory Noise Filtering," arXiv preprint arXiv:2304.14688, 2023, p. 1-37.
Shasha Guo et al., "Low cost and latency event camera background activity denoising," IEEE Transactions on Pattern Analysis and Machine Intelligence, 2023, vol. 45(1), p. 785-795.
Yuhuang Hu et al., "Ddd20 end-to-end event camera driving dataset: Fusing frames and events with deep learning for improved steering prediction," 2020 IEEE 23rd International Conference on Intelligent Transportation Systems (ITSC), IEEE, 2020, p. 1-6.
Simon Thorpe et al., "Spike-base strategies for rapid processing," Neural Network, 2001, vol. 14(6-7), p. 715-725.
Elias Mueggler et al., "Fast Event-based corner Detection," British Machine Vision conference, 2017, p. 1-11.
Henri Rebecq et al., "High Speed and High Dynamic Range Video with an Event Camera," IEEE Transactions on Pattern Analysis and Machine Intelligence, 2019, p. 1964-1980.
Ed Rosten et al., "Machine Learning for High-Speed Corner Detection," Lecture Notes in Computer Science, 2006, vol. 3951, p. 440-443.
Sumon Kumar Bose et al., "A 51.3-TOPS/W, 134.4-GOPS In-Memory Binary Image Filtering in 65-nm Cmos," IEEE Journal of Solid-State Circuits, 2021, vol. 57, p. 323-335.
Xueyong Zhang et al., "A 915-1220 TOPS/W Hybrid In-Memory Computing based Image Restoration and Region Proposal Integrated Circuit for Neuromorphic Vision Sensors in 65nm Cmos," IEEE Custom Integrated Circuits Conference (CICC), 2022, p. 1-4.
Xueyong Zhang et al., "A 915-1220 TOPS/W, 976-1301 GOPS Hybrid In-Memory Computing Based Always-On Image Processing for Neuromorphic Vision Sensors," IEEE Journal of Solid-State Circuits, 2023, vol. 58(3), p. 589-599.
Xin Si et al., "A Twin-8T SRAM Computation-in-Memory Unit-Macro for Multibit CNN-Based AI Edge Processors," IEEE Journal of Solid-State Circuits, 2020, vol. 55(1), p. 189-202.
Angelo Garofalo et al., "Darkside: A Heterogeneous RISC-V Compute Cluster for Extreme-Edge On-Chip DNN Inference and Training," IEEE Open Journal of the Solid-State Circuits Society, 2022, vol. 2, p. 231-243.
Ryad Benosman et al., "Event-Based Visual Flow," IEEE Transactions on Neural Networks and Learning Systems, 2014, vol. 25(2), p. 407-417.
Henri Rebecq et al., "Events-to-Video: Bringing Modern Computer Vision to Event Cameras," IEEE/CVF Conference on Computer Vision and Pattern Recognition (CVPR), 2019, p. 3852-3861.

* cited by examiner

METHOD AND SYSTEM FOR ADAPTIVE CORNER DETECTION USING DYNAMIC VISION SENSORS

FIELD OF THE INVENTION

The present invention generally relates to machine vision techniques. More specifically the present invention relates to corner detection methods and systems.

BACKGROUND OF THE INVENTION

Machine vision is crucial for technological progress in many areas, supporting autonomous vehicles, drones, and robotics. Traditional cameras, capturing scenes through fixed exposure, face challenges with enormous amount of data and transmission speed requirements. Event cameras, addressing this by sampling only at temporal contrast changes, offer benefits like higher dynamic range and lower latency.

In machine vision, it is important to have clear and easily transferable features that work well in various situations and for different tasks. One of the most commonly used and informative features to detect is a "corner". For resources-constrained edge Internet of Things (IoT) application, efficiently processing event data for tasks like corner detection is vital, and there are challenges in current edge IoT applications.

The edge IoT applications need an efficient processing method. The sparse event outputs of stationary cameras enable Deep Neural Networks (DNNs) in edge IoT by duty-cycling processors. Some of the state of the art algorithms show promises for low-level processing like noise removal, but corner detection methods lack optimization for extreme-edge devices. The challenge is to develop an energy-efficient corner detection technique for extreme-edge applications.

Corners are frequently detected using method such as the Harris corner detector or those based on segment, like the Features from Accelerated Segment Test (FAST). These methods are adopted for event-based data using the "Surface of Active Events" (SAE) data structures.

Corner detection is vital for computer vision tasks, with existing techniques facing challenges in throughput and accuracy. Harris-based corner detection methods, such as eHarris, apply the Harris detector to a binary SAE data section around each event. However, processing speed is limited by the number of events, making it less suitable for real-world applications. Segment-based methods like FAST process SAE data faster but may sacrifice accuracy. Asynchronous Corner Detection (ACD) addresses these challenges by enhancing throughput and accuracy. However, it struggles with energy efficiency due to per-event updates, hindering its adoption in extreme-edge Application-Specific Integrated Circuits (ASICs). LuvHarris aims to enhance processing speed while maintaining accuracy by introducing the "Threshold-Ordinance Surface (TOS)" data structure and implementing a multi-threaded processing pipeline. Despite achieving cutting-edge accuracy and increased throughput, LuvHarris faces a challenge in energy consumption during the TOS update, limiting its direct implementation on low-power edge devices like Application Specific Integrated Circuits (ASICs). Therefore, there is a need for an effective solution for corner detection in resource-constrained environment.

SUMMARY OF THE INVENTION

It is an objective of the present invention to provide a method and system to address the aforementioned shortcomings and unmet needs in the current state of the art. The present invention provides an adaptive corner detection method that can be deployed on edge devices, and a system that can be utilize as an edge device. The advantages of the method and the system include: a way to save events without using too much memory while keeping their time order; an efficient method to turn events into a fixed-size matrix for corner detection; and a way to quickly identify corners in events without losing accuracy.

In accordance with a first aspect of the present invention, a method for adaptive corner detection is provided. The method includes: obtaining an event data from a dynamic vision sensor; capturing and organizing a plurality of recorded events of the event data into a 2D array; transforming the 2D array into one or a plurality of Ordered Surface (OS) matrices by populating one or a plurality of empty Image Matrices (IM) with the recorded events based on their coordinates and assigning order values; and applying a corner detector to the OS matrices.

In accordance with a second aspect of the present invention, a system for adaptive corner detection is provided. The system comprises a dynamic vision sensor and a processing device, and the processing device is electrically connected to the dynamic vision sensor. The processing device obtains an event data from the dynamic vision sensor. The processing device captures and organizes a plurality of recorded events of the event data into a 2D array. The processing device transforms the 2D array into one or a plurality of OS matrices by populating one or a plurality of empty IM with the recorded events based on their coordinates and assigning order values. The processing device applies a corner detector to the OS matrices.

In accordance with one embodiment of the present invention, the recorded events are arranged in global temporal ordering in the 2D array.

In accordance with another embodiment, the recorded events are arranged in a plurality of rows in the 2D array. Each of the rows contains a series of the recorded events arranged in global temporal ordering. The numbers of the recorded events in the rows are the same, and the rows are arranged in a global temporal ordering.

In accordance with another embodiment, the maximum number of the recorded events in every row ranges from 25 to 100.

In accordance with another embodiment, each OS matrix is derived from all of the rows of the recorded events in the 2D array.

In accordance with another embodiment, the step of applying the corner detector to one of the OS matrices includes: extracting a patch of elements in the OS matrix; employing a Harris detector to the patch to generate a Harris score; and comparing the Harris score generated by the Harris detector with a predefined threshold.

In accordance with another embodiment, the method comprises: performing sort normalization to the patch of elements before employing the Harris detector.

In accordance with another embodiment, the patch has M rows and N columns, and the M ranges from 7 to 11, and the N ranges from 7 to 11.

In accordance with another embodiment, the method comprises: applying a spatial-temporal correlation filter to the event data before organizing the recorded events into the structured 2D array.

In summary, the method and system of adaptive corner detection of the embodiments of the present invention achieve efficient corner detection. Data from event cameras can be processed at high speed, and the method and system maintain the reliability of corner detection. Also, the method and system of the embodiments process the data with low energy consumption.

BRIEF DESCRIPTION OF THE DRAWINGS

Embodiments of the invention are described in more details hereinafter with reference to the drawings, in which.

DETAILED DESCRIPTION

Figure 1:
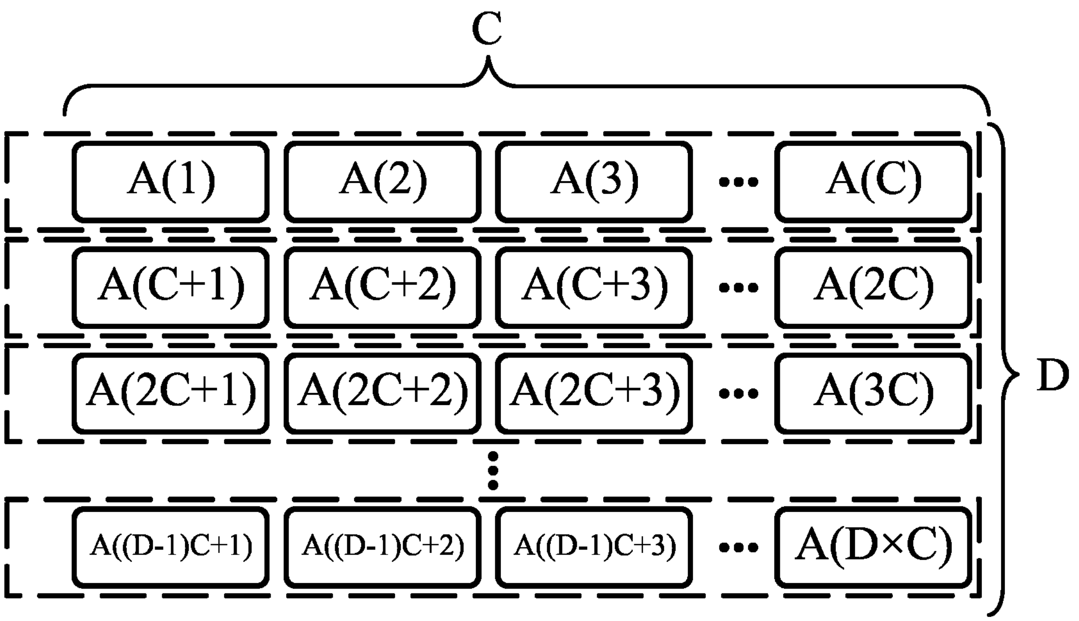
FIG. 1 depicts a schematic view of a 2D array in accordance with an embodiment of the present invention.

In the following description, methods and systems of adaptive corner detection and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance with a first aspect of the present invention, a method for adaptive corner detection using dynamic vision sensors is provided. The method presents a corner detection pipeline that can deployed on edge devices. Features of the method includes: a way to save events without using too much memory while keeping their time order; an efficient method to turn events into a fixed-sized matrix for corner detection; a way to quickly identify corners in events without losing accuracy.

The method includes the following procedures: updating a 2D array with temporal ordering; constructing Ordered Surface (OS) matrices which introduce relative spatial ordering; and perform corner detection.

However, the method is not limited to these procedures. The following will provide a well-illustrated detailed description of this method.

The steps of the method of this embodiment include obtaining an event data from a dynamic vision sensor (DVS).

The DVS of this embodiment is a type of sensor used in computer vision and robotics to detect changes in visual information in a highly efficient and asynchronous manner. The DVS may include an event camera. In some other embodiments, the DVS may include neuromorphic cameras, silicon retinas, or asynchronous cameras.

An event camera is a specialized type of camera that fundamentally differs from traditional cameras. Instead of capturing images at a fixed rate, event cameras detect changes in brightness or intensity at the pixel level and only transmit information when a significant change occurs. This unique feature allows them to operate with exceptionally low latency and high temporal resolution, making them well-suited for capturing fast and dynamic events in real-time, such as rapid motion or sudden changes in lighting.

The DVS of the embodiment provides event data. The event data includes a plurality of recorded events, and each of the recorded events contains four key parameters. The recorded events generated by an event camera encapsulate crucial information about dynamic changes in the visual environment. The four key parameters include: pixel coordinates (x, y), timestamp (t), and polarity (p).

The pixel coordinates pinpoint the location in the camera's field of view where the event occurred, offering spatial specificity. The timestamp provides the precise moment when the event took place, allowing for accurate temporal resolution. Importantly, the polarity indicates whether the change in brightness was an increase or decrease, conveying the directionality of the observed alteration in luminance.

These parameters collectively contribute to the unique advantages of event cameras. The asynchronous nature of event data transmission, driven by these parameters, enables them to capture fast and subtle changes in real-time with minimal latency. This distinctive approach to sensing visual information makes DVS of this embodiment particularly valuable in applications requiring quick and precise responsiveness, such as robotics, autonomous systems, and computer vision tasks where traditional frame-based cameras may fall short.

In this embodiment, after the event data is obtained, the method includes capturing and organizing the recorded events of the event data into the 2D array.

In this step, at least some of the recorded events in series is captured. In this embodiment, the recorded events are captured in real time, and the recorded events are organized according to its timestamp. To be specific, the pixel coordinates, i.e. x, y, are the main information of elements that is saved in the 2D array, and each of the elements is corresponded to one of the recorded events, while the arrangement is according to the timestamp of each recorded events.

In other words, in the 2D array of this embodiment, each element corresponds to a recorded event and contains essential pixel coordinates, denoted as x and y. The arrangement of the elements is based on the timestamps of the recorded events, providing a chronological order of the events.

The method accordance with this embodiment constructs a 2D array, initialized with 0's as its initial entry values. Subsequently, upon acquiring data from the event camera, the temporal sequence of event records is systematically populated into the corresponding 2D array entries. This process ensures that the 2D array encapsulates the temporal evolution of the recorded events, providing a structured representation of the data within the context of data processing.

In other words, in this embodiment, after multiple recorded events are captured, the recorded events are arranged in a plurality of rows. During organizing the recorded events, after all the entries of a row entries are filled with the recorded events, subsequent recorded events are arranged to fill in the entries of the next row, so on and so forth. Entries of rows not filled by recorded events remain to contain the 0. As the plurality of rows is built, the 2D array of information corresponding to the recorded events is formed.

In the 2D array of this embodiment, the arrangement of the recorded events contains the temporal information. Each of the recorded events has the coordinate parameters indicating a location, specifically the pixel coordinates on the frame. Thus, the 2D array contains both spatial and temporal information.

FIG. 1 is a schematic drawing of a 2D array of this embodiment. In this embodiment, each element in the 2D array exclusively includes coordinates (x, y). For example, the element A(1) contains ($x_1$, $y_1$), and the element A(C) contains ($x_C$, $y_C$), resulting in a small and compact array size, which is C×D to store the events. The C indicates the number of columns, and the D indicates the depth of the array. The memory cells, i.e., elements, in the 2D array are now storing coordinates instead of timestamp of the incoming events, and the design is particularly advantageous for subsequent corner detection procedure. In another embodiment, the elements may be Address Event Representation (AER) events and contain other information from the recorded events of the event data form the DVS.

In this embodiment, after the 2D array is organized, the method includes transforming the 2D array into one OS matrix by populating one empty Image Matrices (IM) with the recorded events based on their coordinates and assigning order values.

In the transformation process from the structured 2D array to the OS, we first capture and organize recorded events into the 2D array, where each element represents a specific event and contains pixel coordinates (x, y). Instead of storing timestamps, we employ the order values, which are indices indicating the temporal order of the events. This eliminates the need for large timestamp storage, resulting in a more memory-efficient representation.

Next, the OS is constructed by populating an empty IM with the pixel coordinates of the recorded events and assigning order values to each element. The IM effectively organizes events into a spatial structure, restoring the spatial ordering that might be lost in the 2D array representation. The assignment of order values maintains the temporal ordering of events, creating a coherent and efficient representation for subsequent corner detection.

This approach not only reduces the memory footprint compared to traditional timestamp-based representations like Time Surfaces but also provides a structured OS matrix that is conductive to effective corner detection methods. The resulting OS matrix, organized both spatially and temporally, serves as a foundation for further image processing and analysis in various applications.

Figure 2:
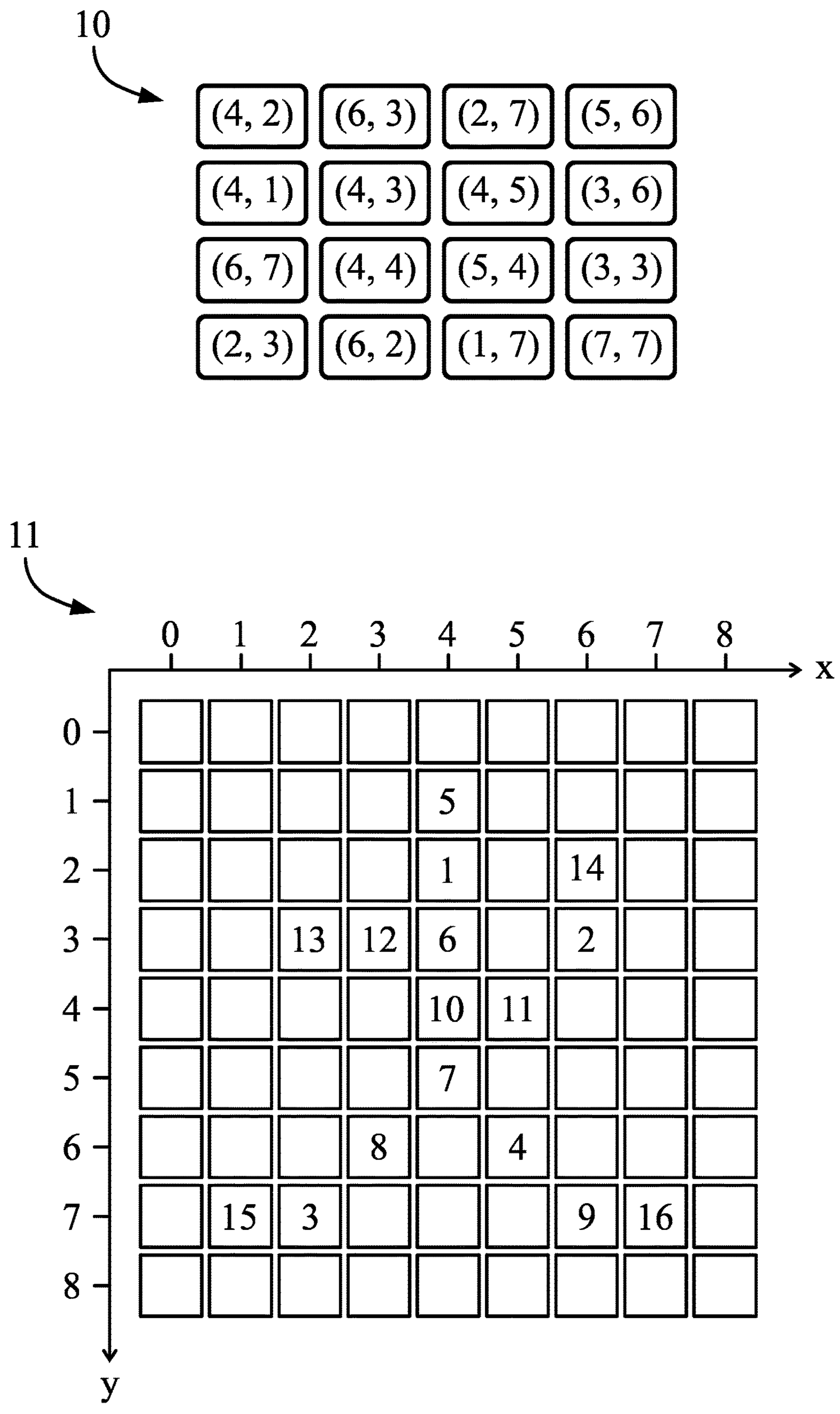
FIG. 2 depicts a schematic view of a 2D array and the corresponded OS in accordance with another embodiment of the present invention.

Referring to FIG. 2 for the following description. An exemplary and simplify 2D array 10 is presented. The 2D array 10 has 4 rows, and each row has 4 elements. In this embodiment, the elements in a row is arranged from left to right, and the rows are arranged from top to bottom. According to the order of these elements, the order values are assigned respectively from 1 to 16, and each order value is fill in the position in the IM according to each coordinate of the elements, so as to form the OS matrix 11.

Through this transformation, the spatial information is reconstructed in the OS, and the subsequent procedure of the corner detection can proceed. In other words, by employing the 2D array and the OS matrix, we minimize the event data from the DVS. This reduction in data enhances the efficiency of the subsequent corner detection process. Essentially, these steps optimize data storage without compromising spatial and temporal information essential for corner detection. As a result, the detector operates swiftly and efficiently.

After the transformation of the OS matrix, the method of this embodiment proceeds with applying a corner detector to the OS matrix. Due to the reduction in data, the efficiency of the performance of the corner detector is improved. Therefore, the method for adaptive corner detection of this embodiment can provide an effective solution for corner detection. This tailored approach not only enhances the efficiency of corner detection but is particularly well-suited for resource-constrained environments, such as IoT. Consequently, the detector operates swiftly and efficiently, making it an ideal solution for edge IoT applications.

In another embodiment of the present invention, a system for the adapting corner detection is provided. The system comprises a DVS and a processing device, which is electrically connected to the DVS.

The processing device of this embodiment acquires event data from the DVS and executes subsequent steps for corner detection. Specifically, the device captures and organizes multiple recorded events within the event data into a structured 2D array. Subsequently, it transforms this 2D array into an OS matrix by populating an IM with recorded events based on their coordinates, and assigns order values. Finally, the processing device applies a corner detector to the resulting OS matrix.

Similar to the methodology outlined in the previous embodiment, the adaptive corner detection system in this embodiment excels in efficiently executing corner detection with low system requirement. This characteristic makes the system a suitable choice for deployment in edge IoT applications.

Figure 3:
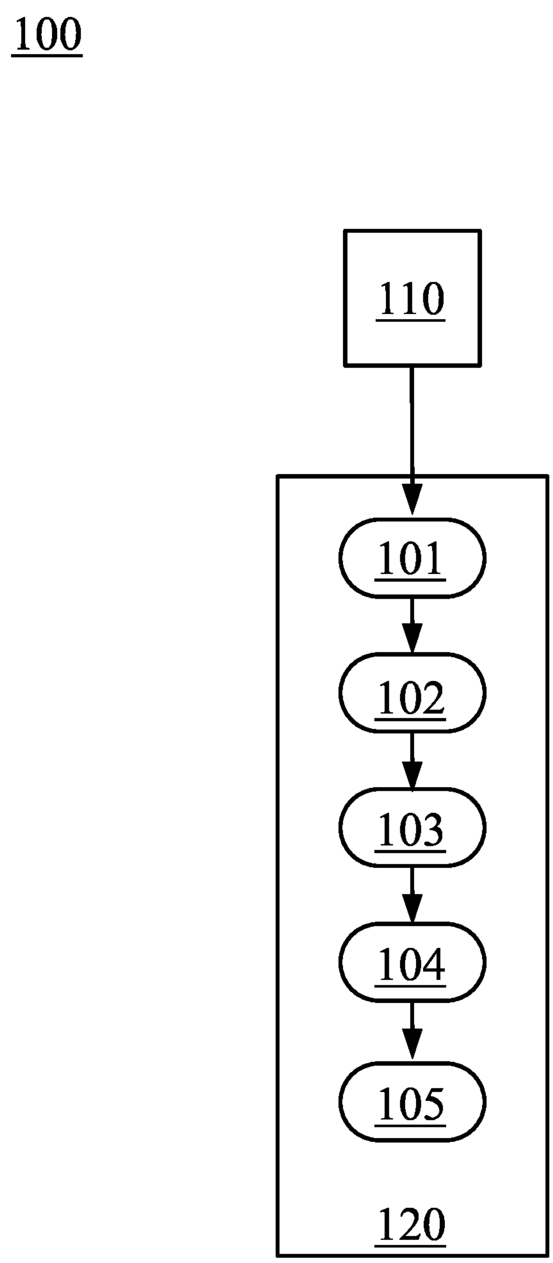
FIG. 3 depicts a schematic view of a system for adapting corner detection in accordance with another embodiment of the present invention.

Referring to FIG. 3 for the following description. The system 100 for adaptive corner detection has the DVS 110 and the processing device 120. The processing device 120 obtains the event data 101 from the DVS 110, and the processing device 120 organize the recorded events of the event data 101 into the 2D array 102, and the processing device 120 transforms the 2D array 102 into the OS matrix 103, and the processing device 120 applies the corner detector to the OS matrix and generate a detection score 104, and the processing device 120 can output an indicator 105 by comparing the detection score 104 with a predefined threshold. The indicator 105 can indicate whether a corner is detected in the event data 101 or not, and the indicator 105 can be transmit to a output device such as display, light signal, or proceed to a subsequent procedure for robotics or autonomous control of a vehicle.

In this embodiment, the processing device 120 can include an edge processing unit. The edge processing unit is optimized for power efficiency and can handle real-time processing. In some embodiments, the edge processing unit includes: ARM based microcontrollers (MCU) from ST Micro (STM32F412, STM32F746, STM32H743), NXP (LPC1751FBD80) and Microchip (PIC32C series). By leveraging adaptive corner detection procedures of this embodiment, our system excels in optimizing corner detection efficiency across variety of edge processing units. This makes it particularly well-suited for machine vision applications and other automated moving surveillance devices integrated into vehicles, showcasing its versatility and effectiveness in dynamic environments.

Figure 4:
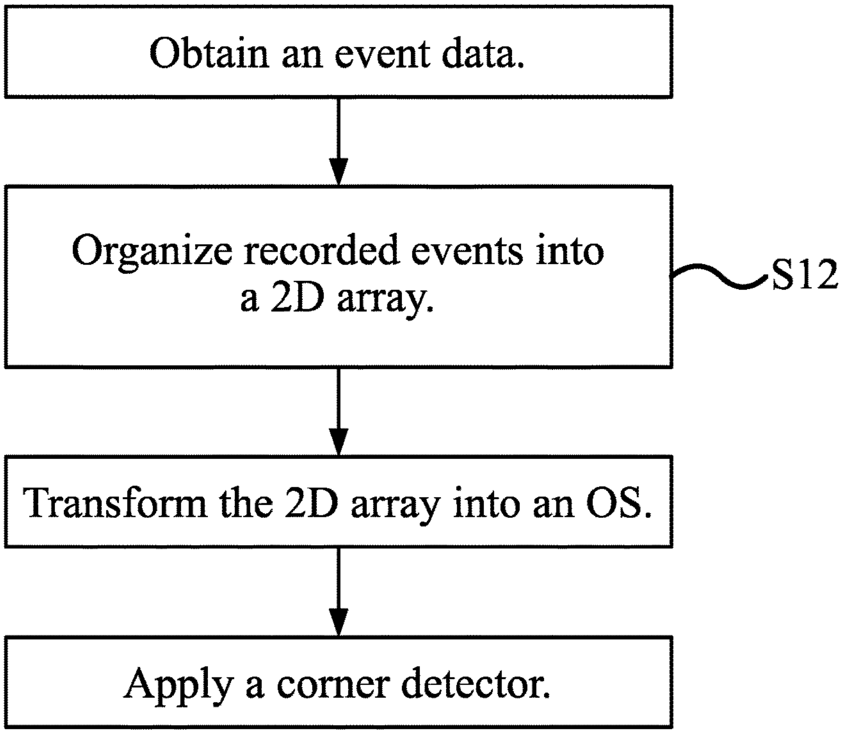
FIG. 4 depicts a flow chart of the procedures of a method or a system for adapting corner detection in accordance with some embodiments of the present invention.

FIG. 4 shows a flowchart of the procedure of the method and system for adaptive corner detection of some embodiments of the present invention. In some embodiments, in the process of organizing recorded events into a 2D array (S12), the events are structured and arranged according to a global temporal order within the 2D array.

In these embodiments, global temporal ordering ensures that recorded events in the 2D array maintain a coherent temporal sequence, which is crucial in corner detection. The 2D array contains clear and precise chronological order of recorded events for corner detection.

Also, the global temporal ordering facilitates efficient processing of recorded events in the 2D array. This can lead to streamlined methods for corner detection, resulting in improved overall system efficiency.

In these embodiments, the global temporal ordering helps in accurately capturing and representing the temporal evolution of visual information. This precision is beneficial for corner detection, contributing to the ability to detect corners with high accuracy.

In accordance with various embodiments of the present invention, the recorded events are arranged in a plurality of rows in the 2D array. Each of the rows has a series of the recorded events arranged in global temporal ordering, and the numbers of the recorded events in the rows are the same.

The rows of these embodiments are arranged in global temporal ordering. To be specific, the timestamps of the elements (i.e., events) arranged in one of the rows are smaller than all the timestamps of the elements (i.e., events) arranged in the following rows, and the timestamps of the elements (i.e., events) in the second row are larger than all the timestamps of the elements (i.e., events) in the first row.

In these embodiments, the rows with consistent number of elements simplify the data processing pipeline. This uniformity allows for standardized procedures and computations when working with each row, streamlining the computational process steps of the system.

Also, in these embodiments, uniform row lengths create opportunities for parallelization in data processing. By having rows with the same number of elements, parallel processing techniques can be more easily applied with GPU and multi-core processors, potentially leading to significant speedups in the overall event data processing. This benefit is particularly relevant in applications where real-time or high-throughput processing is essential.

In an embodiment of the present invention, the maximum number of the recorded events in every row is 100. However, the invention is not limited to the number. In some other embodiments, the maximum number of the recorded events in every row can be 25, 50, 100, or any values from 25 to 100. By utilizing the 2D array having these configurations, the method or the system can change the frequency at which the system performs corner detection, by varying C. The 2D array is also customizable, by being able to shrink down as event rate of the scene decreases.

In this embodiment, the recorded events are captured and organized continuously, which is forming a one-dimensional sequence in multiple rows, and no repetition of recorded events are present in these rows. However, the present invention is not limited to this manner. Referring to FIG. 1 for the following description. In some other embodiments of the present invention, the recorded events are organized in batches. For example, the number of recorded events in every batch is C, and the number of the batches in this 2D array is D. In these embodiments, overlapping stride is applied on the rows of the recorded events in the 2D array. In other words, some recorded events at the end of one batch are included at the beginning of the following batch, allowing for a more continuous and overlapping analysis of the event history.

In these embodiments, applying overlapping stride on the rows of the recorded events within the 2D array introduces a crucial feature that optimizes the system's ability to capture dynamic and evolving patterns in the visual data. The use of overlapping stride enables the system or method to explore and analyze temporal relationships between recorded events more comprehensively. Instead of processing each row in isolation, the overlapping stride ensure that adjacent rows share a portion of their recorded events, allowing for a seamless integration of temporal information across the 2D array.

The main advantage of applying overlapping stride in the method or system of these embodiments lies in its enhancement of temporal context. By incorporating events from neighboring rows in the processing pipeline, the method or system gain a more nuanced understanding of the temporal evolution of visual information. This is particularly beneficial in scenarios where recorded events occur rapidly or in quick succession, ensuring that the system does not miss crucial temporal correlations. The overlapping stride effectively create a temporal buffer, enabling the system or method to capture and interpret recorded events within a broader time window.

Furthermore, in these embodiments, the use of overlapping stride aligns with the principle of adaptability in dynamic environments. It provides the system or method with the flexibility to adapt varying speed or rates of change in the visual input. Whether events are occurring rapidly or at a slower pace, the overlapping stride enables the system or method to maintain responsiveness and accuracy in capturing temporal dynamics. The feature enhances the system's robustness in real-world applications, making it well-suited for corner detection in dynamic and unpredictable environments.

Figure 5:
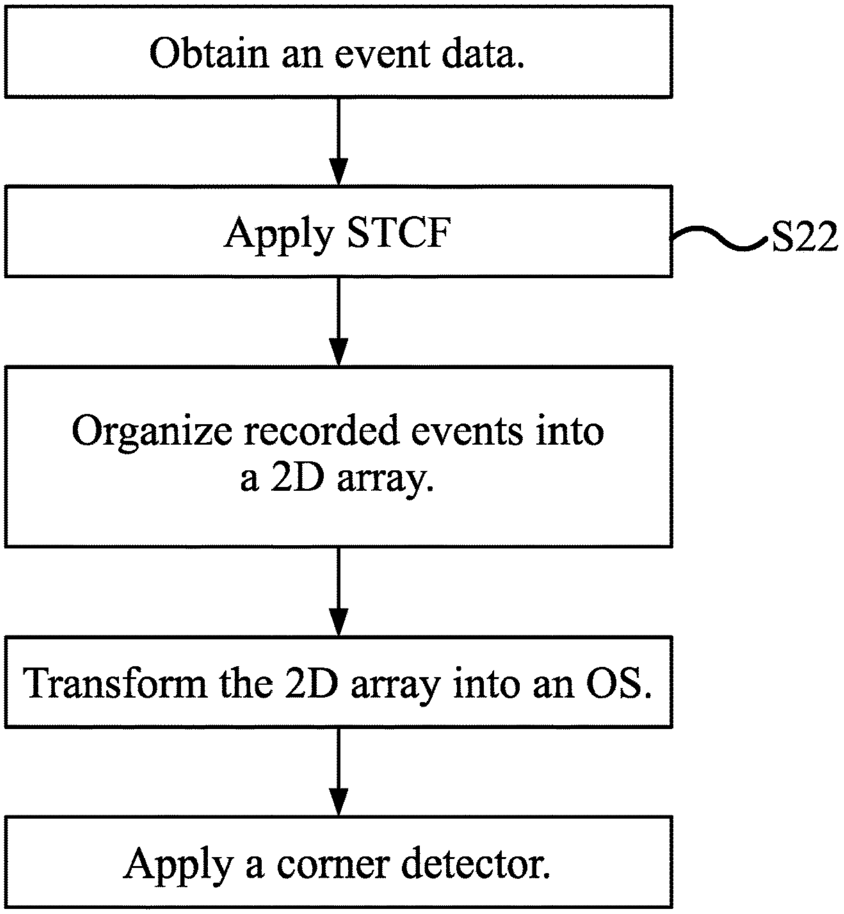
FIG. 5 depicts a flow chart of the procedures of a method or a system for adapting corner detection in accordance with another embodiment of the present invention.

FIG. 5 shows a flowchart of the procedure of the method and system for adaptive corner detection of some other embodiments of the present invention. In these embodiments, the method or system applies a Spatial-Temporal Correlation Filter (STCF) to the event data (S22) before organizes the recorded events into the 2D array.

In these embodiments, applying the STCF to recorded events before organizing them into a 2D array introduces a powerful feature that enhances the system's ability to discern meaningful patterns in the event data. This filtering mechanism operates by considering both the spatial and temporal dimensions of the recorded events, capturing the correlation between neighboring events in a coherent manner.

The method or system of these embodiments apply STCF after obtaining the event data from the DVS. The primary advantage of this STCF lies in its capability to prioritize relevant information, discarding noise or inconsequential events. By considering the correlation between events in both space and time, the filter refines the event data, emphasizing sequences of events that are likely to represent meaningful patterns or visual features. This not only enhances the precision of subsequent processing steps but also contributes to the overall efficiency of the system by focusing computational resources on pertinent information.

Moreover, the step S22 of applying the STCF aligns with the principles of neuromorphic vision, mimicking the brain's ability to recognize patterns in a holistic and context-aware manner. This feature ensures that the system or method of these embodiments not only captures individual events but also interprets their collective significance, facilitating more nuanced and contextually relevant analyses. In essence, the STCF acts as a sophisticated preprocessing step, imbuing the system or the method with the capability to discern meaningful patterns from the stream of recorded events, thereby enhancing the system's overall performance in corner detection or any other related event-based processing.

Figure 6:
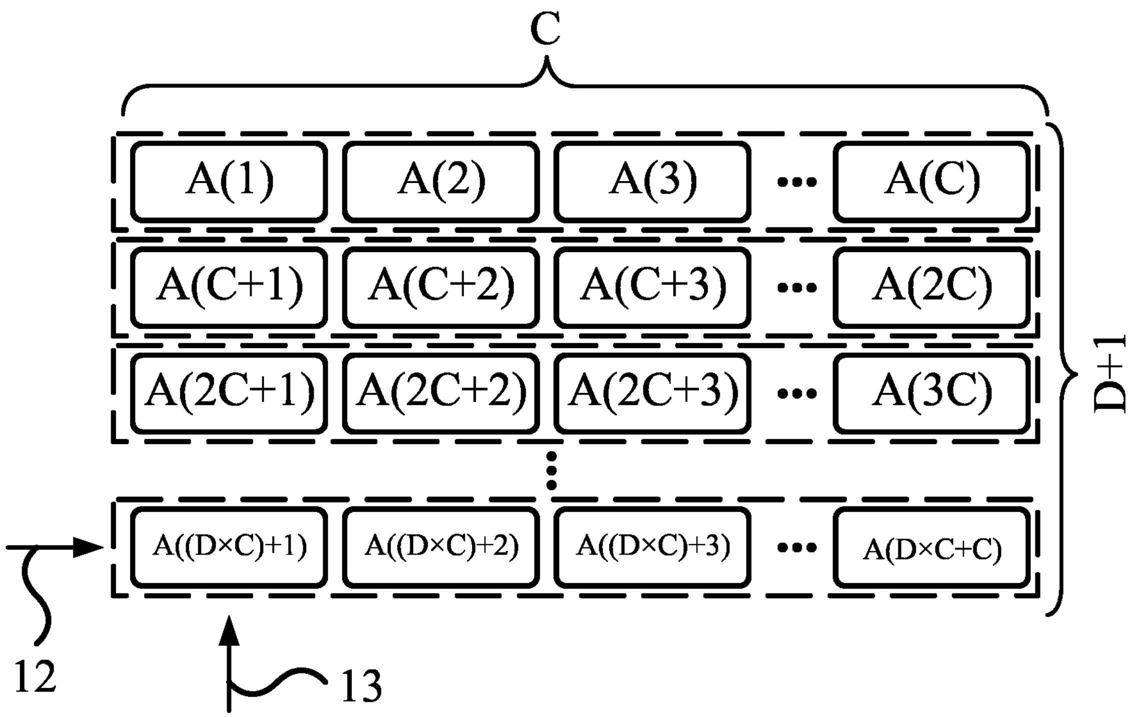
FIG. 6 depicts a schematic view of a 2D array in accordance with another embodiment of the present invention.

In some embodiments of the present invention, the method and the system processing the method include usage of row pointer and column pointer. Referring to FIG. 6 for the following description. A row pointer 12 and a column pointer 13 are included in the 2D array. The row pointer and the column pointer keep track of the insertion location in the 2D array.

In these embodiments, the row pointer 12 and the column pointer 13 are essential elements used to navigate and access specific elements within the 2D array where recorded events are organized. The rows of the 2D array are logical rows implemented by the column pointer that moves in a cyclical fashion across the physical rows in the memory.

The row pointer of these embodiments is a variable or indicator that keep track of the current row being processed or accessed within the 2D array. As the system iterates through the rows, the row pointer is updated to point to the next row of interest. This allows the system to sequentially process events along the temporal dimension.

On the other hand, the column pointer of these embodiments operates within a specific row. It indicates the current position or element within the row that the system or method is examining or processing. As recorded events are organized into columns, the column pointer assists in navigating through the spatial dimension of the 2D array.

Both pointers of these embodiments are crucial for maintaining the system's awareness of its position within the data structure, enabling it to efficiently process and analyze the recorded events. They play a key role in the sequential analysis of recorded events or when specific recorded events need to be accessed and manipulated within the 2D array.

In other words, the row pointer and column pointer are like the navigation tools that keep our system precisely tuned into the vast landscape of recorded events in the architecture of our 2D array. The row pointer takes charge of our temporal journey, diligently indicating the specific row under scrutiny as we traverse through the chronological sequence of events. It's the guide that ensures we're always on track, never losing our place in the dynamic flow of temporal data. Meanwhile, the column pointer is our spatial maestro, orchestrating the movement within a given row. It directs our attention to the exact recorded event within that row, allowing us to meticulously navigate the spatial dimension of our array. Together, these pointers provide the system or the method with the agility to explore both time and space, ensuring an efficient and coherent analysis of the recorded event data.

Referring to FIG. 6 for the following description. The number of the rows of the 2D array of these embodiments is (D+1), which means an additional row is included in this 2D array. The additional row is used to allow insertion of recorded events while subsequent procedures are performed. It allows the dynamic insertion of events while concurrently performing the step of applying the corner detector on the OS matrix.

The additional row of these embodiments is likely implemented as a buffer or a placeholder row where new events can be temporarily stored before being incorporated into the OS. This approach is particularly advantageous when dealing with asynchronous event data from a DVS where events occur at irregular intervals.

For instance, the step of applying the corner detector to the OS matrix in these embodiments includes employing a Harris detector. As new events are detected by the DVS, they can be inserted into the additional row without interrupting the ongoing Harris detector operation on the rest of the OS matrix. This ensures a continuous flow of data processing without the need to pause or reset the analysis when new events occur.

Also, the ability to insert recorded events into the separate additional row while concurrently performing Harris detector operation on the OS matrix helps minimize latency. The method and the system using the method can adapt real-time changes in the visual input, capturing and evaluating recorded events in near real-time without significant delays.

Furthermore, the additional row of these embodiments provides a mechanism for efficient memory management. New events can be selectively incorporated into the OS matrix when deemed necessary, preventing unnecessary expansion or reallocation of memory, which is crucial in resource-constrained environment.

Referring to FIG. 2 for the following description. In some embodiments, the OS matrix 11 is derived from all the rows of the recorded events in the 2D array 10, so there will be enough temporal and spatial information to make meaningful corner detection. Transforming the full 2D array into a signal OS matrix offers several advantages in data processing.

One key benefit of the transforming of these embodiments is the consolidation of spatial-temporal information into a unified structure, simplifying subsequent analyses. This transformation streamlines the computations, which can be applied more efficiently to a singular OS rather than navigating through the complexities of a 2D array. Furthermore, the transition to a single OS matrix enhances data locality, potentially optimizing cache utilization and reducing memory access times. This consolidation also aids in parallel processing, allowing for concurrent operations on a cohesive dataset. Overall, in these embodiments, the transformation to a single OS enhances computational efficiency, reduces memory overhead, and fosters a more cohesive and accessible representation of the underlying spatial-temporal information.

In some embodiments, the transformation procedure may be represented by the following execution steps:

```
Require: 2D Array, rowPtr (row pointer), OS
SET T, OS to 1, 0
// rowPtr (row pointer): Variable indicating the current
   row being processed in the 2D array.
   For r from ((rowPtr+2) mod (D+1)) to rowPtr do
      For c from 0 to C do
         x, y←array[r,c]
         OS[x,y]←T
         T←T+1
      End For
   End For
```

In these embodiments, the OS only require D write per event, which require much less writing times than luvHarris. While the method in accordance with these embodiments utilizes a logical pointer (i.e., row pointer or column pointer) that denotes the current entry in the process, the logical pointer's movement across the physical rows of the memory is facilitated by a cyclic operation determined by the modulus (mod) operation in the steps above, ensuring that the logical pointer cycles through the rows of the memory in a cyclical manner.

In another embodiment, the OS matrix is derived from some of the adjacent rows of the recorded events in the 2D array. For example, an OS matrix derived from three adjacent rows in the 2D array, and a plurality of the OS matrices is transformed from one 2D array.

In this embodiment, the method or system including this transformation is optimized for DVS that has higher sensitivity or sensing rate.

In still another embodiment, the OS matrix is derived from one of the rows of the recorded events in the 2D array. Therefore, a plurality of the OS matrices are transformed from one 2D array, and every OS matrix is corresponded to latest row of the recorded events.

In this embodiment, the method or system including this transformation is optimized for DVS that has high throughput in every second, and the adaptive corner detection is provided with high sensitivity.

Figure 7:
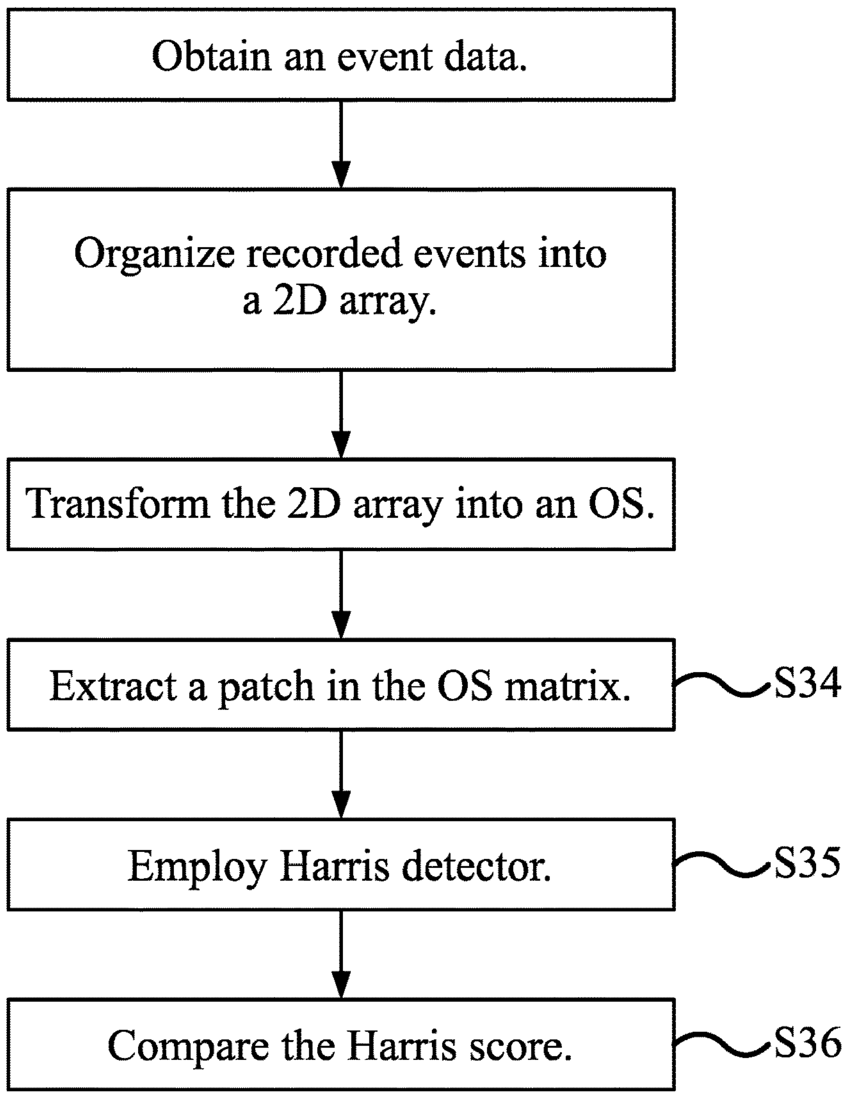
FIG. 7 depicts a flow chart of the procedures of a method or a system for adapting corner detection in accordance with another embodiment of the present invention.

Referring to FIG. 7 for the following description. In another embodiment, the method includes extracting a patch of elements in the Ordered Surface matrix S34; employing a Harris detector to the patch to generate a Harris score S35; and comparing the Harris score generated by the Harris detector with a predefined threshold S36.

In this embodiment, a patch surrounding the event of interest is extracted from the OS for the Harris detector or Harris calculation, so as to take advantage of the sparsity of events. The steps S34, S35, S36 optimized the process for efficient feature detection. The steps define a systematic approach to selecting a region or patch from the OS centered around a particular event, allowing the Harris detector to focus on specific spatial locations of interest within the OS.

One notable feature of this patch extraction process is its parameter tunability, enabling the algorithm to dynamically adjust the size and configuration of the patch. This flexibility ensures that the Harris detector can effectively capture and analyze features at different scales, contributing to the algorithm's robustness in identifying corners and relevant patterns in the visual data.

Additionally, the step S34 often incorporates considerations for neighboring events and their contributions to the patch. This ensures that the Harris detector leverages spatial-temporal correlations present in the OS matrix, enhancing its ability to discern meaningful features. The adaptive and parameterizable nature of the patch extraction process plays a pivotal role in the overall success of the Harris detector, making it well-suited for diverse applications in data processing and computer vision.

In various embodiments, the patch has M rows and N columns, and the M ranges from 5 to 11, and the N ranges from 5 to 11. Therefore, the method or system of the embodiments can capture the salient information stored within the OS while consuming minimal memory when using the Harris detector. Moreover, the patch sizes play a crucial role in corner detection, such as using the Harris detector, particularly for images with resolutions such as 240×180 or 360×260. In certain embodiments, it is beneficial to choose alternate patch sizes based on varied resolution of the event camera. In other words, the method and system in these embodiments offer flexibility in choosing the patch size. This adaptability allows the method and system to be employed with various types of event cameras, ensuring effective corner detection across different scenarios.

In certain embodiments, the values of M and N may be the same, and the method utilizes square patches. Therefore, the output of the Harris detector can be determined by referring to the existing dataset, so as to improve the efficiency. For example, the M and N can both be 5, 7, 9, 11, or any proper odd number, depending on the resolution of the event camera. As such, the methods in accordance with the embodiments of the present invention are flexible and applicable in systems with different event camera resolution.

Figure 8:
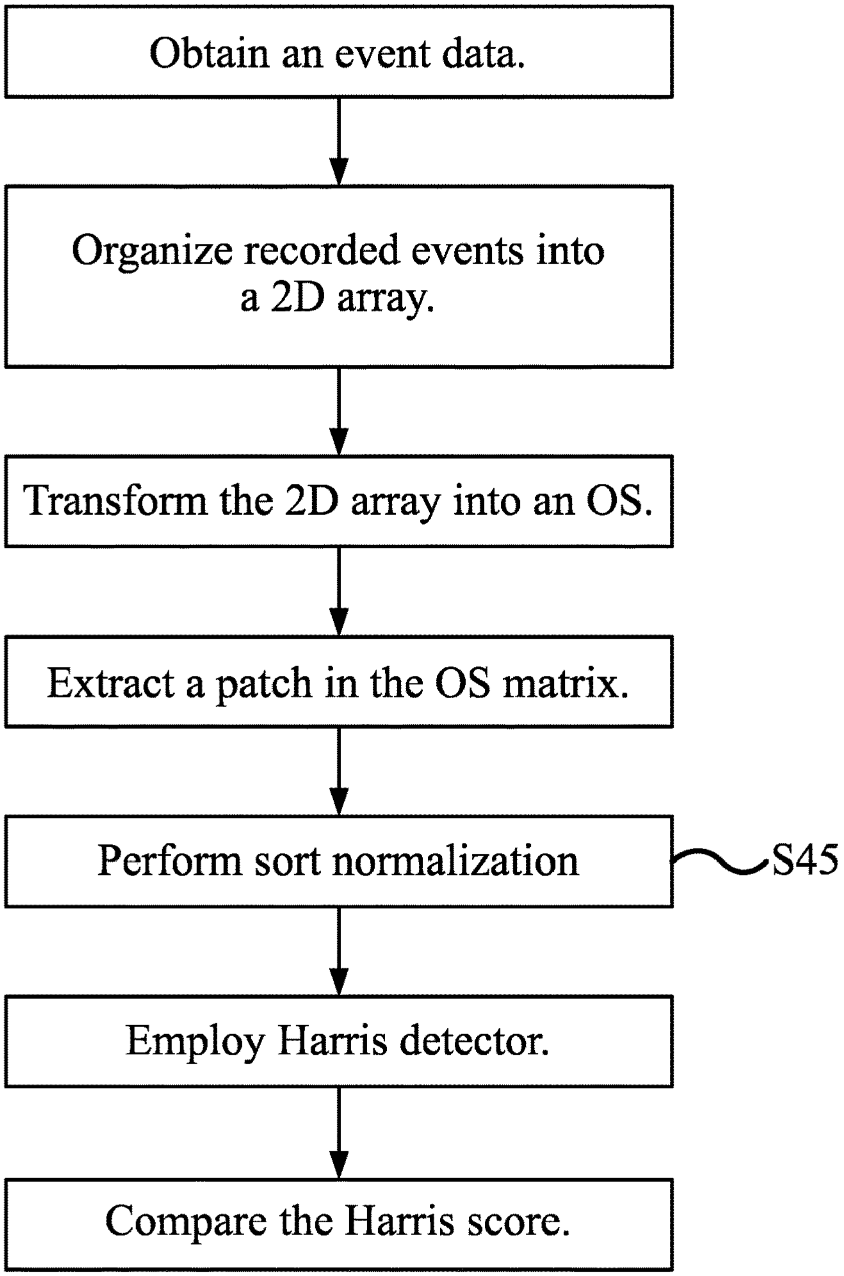
FIG. 8 depicts a flow chart of the procedures of a method or a system for adapting corner detection in accordance with still another embodiment of the present invention.

In some embodiments, a sort normalization may be applied to the OS matrix before the corner detection is performed. Referring to FIG. 8 for the following description. The method comprises performing sort normalization to the patch of elements S45 before employing the Harris detector.

The sort normalization of these embodiments modified the range of value of the temporal information in the OS matrix. To be specific, the step bypasses approaches involving costly division operations. In this procedure S45, the non-zero values within the patch are collected and arranged in descending order within a queue. Subsequently, these values undergo sort normalization, where the normalized pixel value is computed as 255 minus the index. Here, the index denotes the pixel's position within the sorted queue. This approach not only optimizes computational efficiency but also aligns with theoretical concepts like rank order coding, reflecting a sophisticated strategy reminiscent of visual cortex encoding. The result is a streamlined and adaptable normalization method that significantly enhances the system's or method's overall performance in visual data processing applications.

In some embodiments, the local patch construction and Harris calculation may be represented by the following execution steps below:

```
Require: x, y, OS, k (Patch Half Size)
For r from −k to k do
  For c from −k to k do
    px, py+c+k, r+k
    Patch [px, py]←OS [x+c, y+r]
  End For
End For
Sort SortQueue in descending order
SortValue←255
For value in SortQueue do
  Patch Value←SortValue
  SortValue←SortValue−1
End For
Score←HarrisDetector (Patch)
If Score≥Threshold then
  CornerFlag←True
Else
  CornerFlag←False
End If.
```

The method and the system of the embodiments of the present invention provide an event-based corner detection for edge device, which uses minimized memory. Despite the smaller memory footprint and energy usage, the method and system achieve accuracy comparable/better than luvHarris.

In various embodiments, in-memory computing (IMC) techniques are utilized to accelerate processing, and the adaptive corner detection may be executed by a machine vision processor implemented using specially configured computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Machine instructions running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having machine instructions stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for adaptive corner detection in machine vision, comprising:
- obtaining one or more event data from a dynamic vision sensor;
- capturing and arranging, by a machine vision processor, a plurality of recorded events of the event data into a 2D array, wherein entries of the 2D array store pixel coordinates of respective recorded events without storing timestamps as entry values, and the entries of the 2D array are arranged in global temporal ordering to preserve a temporal order of the recorded events such that the 2D array has an array dimension being smaller than the dynamic vision sensor's pixel array dimension;
- transforming, by the machine vision processor the 2D array into one or a plurality of ordered surface matrices by populating one or a plurality of empty image matrices with the recorded events based on the stored pixel coordinates and assigning order values indicating the temporal order of the recorded events;
- applying, by the machine vision processor, a corner detector to the ordered surface matrices; and
- outputting a corner detection result from the corner detector.

2. The method of claim 1,
- wherein the recorded events are arranged in a plurality of rows in the 2D array, and each of the rows has a series of the recorded events arranged in global temporal ordering; and
- wherein the numbers of the recorded events in the rows are the same, and the rows are arranged in global temporal ordering.

3. The method of claim 2, wherein a maximum number of the recorded events in every row ranges from 25 to 100.

4. The method of claim 2, wherein each ordered surface matrix is derived from all the rows of the recorded events in the 2D array.

5. The method of claim 1, wherein the step of applying the corner detector to one of the ordered surface matrices includes:
- extracting a patch of elements in the ordered surface matrix;
- employing a Harris detector to the patch of elements to generate a Harris score; and
- comparing the Harris score generated by the Harris detector with a predefined threshold.

6. The method of claim 5 further comprising:
- performing sort normalization to the patch of elements before employing the Harris detector.

7. The method of claim 5, wherein the patch has M rows and N columns, and the M ranges from 7 to 11, and the N ranges from 7 to 11.

8. The method of claim 1 further comprising:
- applying a spatial-temporal correlation filter to the event data before organizing the recorded events into the 2D array.

9. A system for adaptive corner detection in machine vision, comprising:
- a dynamic vision sensor; and
- a machine vision processor electrically connected to the dynamic vision sensor;
- wherein the machine vision processor is configured to:
  - obtain one or more event data from the dynamic vision sensor;
  - capture and arrange a plurality of recorded events of the event data into a 2D array, wherein entries of the 2D array store pixel coordinates of respective recorded events without storing timestamps as entry values, and the entries of the 2D array are arranged in global temporal ordering to preserve a temporal order of the recorded events such that the 2D array has an array dimension smaller being than the dynamic vision sensor's pixel array dimension;
  - transform the 2D array into one or a plurality of ordered surface matrices by populating one or a plurality of empty image matrices with the recorded events based on the stored pixel coordinates and assigns order values indicating the temporal order of the recorded events; and
  - apply a corner detector to the Order Surface matrices to output a corner detection result.

10. The system of claim 9, wherein the recorded events are arranged in a plurality of rows in the 2D array, and each of the rows has a series of the recorded events arranged in global temporal ordering, and the numbers of the recorded events in the rows are the same.

11. The system of claim 10, wherein a maximum number of the recorded events in every row ranges from 25 to 100.

12. The system of claim 10, wherein each ordered surface matrix is derived from all of the row of the recorded events in the 2D array.

13. The system of claim 9, wherein the processing device extracts a patch of elements in the ordered surface matrix;
- wherein the processing device employs a Harris detector to the patch of elements to generate a Harris score; and
- wherein the processing device compares the Harris score generated by the Harris detector with a predefined threshold.

* * * * *